Dec. 26, 1922.
J. R. JUNKIN.
DUMP BODY HOIST.
FILED JUNE 13, 1921.
1,440,155
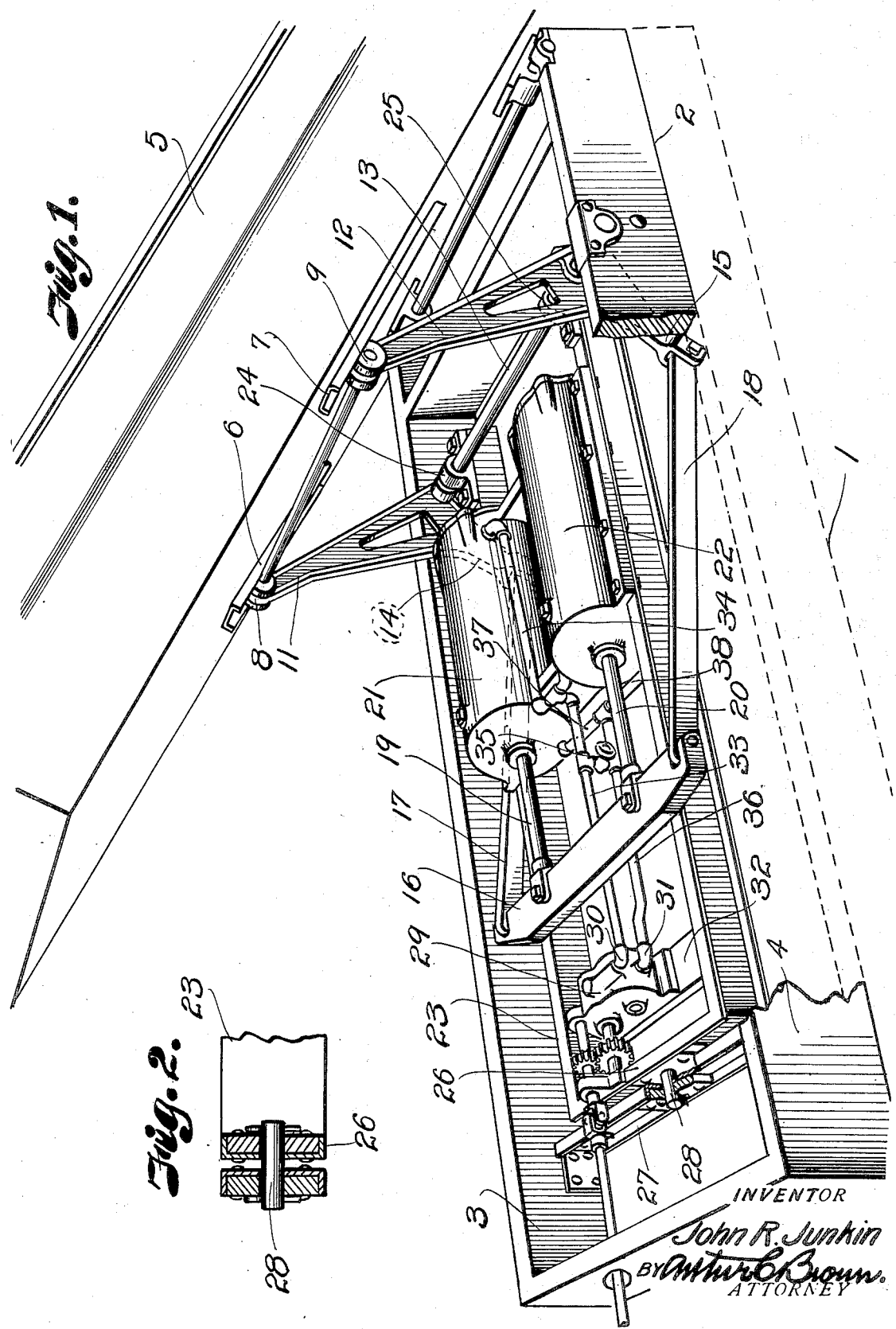
INVENTOR
John R. Junkin
BY Arthur C. Brown
ATTORNEY Patented Dec. 26, 1922.

1,440,155

UNITED STATES PATENT OFFICE.

JOHN R. JUNKIN, OF KANSAS CITY, MISSOURI, ASSIGNOR TO AGNES A. JUNKIN, OF INDEPENDENCE, MISSOURI.

DUMP-BODY HOIST.

Application filed June 13, 1921. Serial No. 477,086.

*To all whom it may concern:*

Be it known that I, JOHN R. JUNKIN, a citizen of the United States, residing at Kansas City, in the county of Jackson and State of Missouri, have invented certain new and useful Improvements in Dump-Body Hoists; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to hoists and operating mechanism therefor, used in connection with dumping vehicles.

With the usual construction a running gear or chassis is provided, upon which is mounted a body supporting frame to which, in turn, is hinged a dumping body. The body supporting frame also carries the hoist operating mechanism as well as the hoist per se. Therefore, the load is communicated directly to the secondary or body supporting frame, subjecting it to all of the twists and strains incident to the movement of the body over uneven roadbeds. As a result, it not infrequently happens that the pipe connections break loose, rendering the power elements for the hoist ineffective.

I have provided means whereby the power elements for the hoist may be conveniently supported upon a special frame having a three point suspension connection with the secondary frame, thus allowing the chassis and the body frame or secondary frame to twist or flex without communicating the flexing distortion to the power element supporting frame.

The novel arrangement of the parts and combinations of parts will be specifically described hereinafter, reference being had to the accompanying drawings, in which Fig. 1 is a perspective view of a secondary or body supporting frame and the power element supporting frame, showing the hoist in body raising position and the chassis in dotted lines, parts being broken away to more clearly illustrate certain other parts, and Fig. 2 is a cross sectional view through one end of the power element supporting frame and a bar which in turn supports it.

Referring now to the drawings by numerals of reference:

1 designates the chassis or running gear frame and 2 is the body supporting or secondary frame, both frames being substantially rectangular and one superposed upon the other. Hinged to the rear ends of the side bars 3 and 4 of the secondary frame is a dump body 5 having on its bottom rails or channels 6 and 7, in which may operate the anti-friction rollers 8 and 9 on the upper ends of the hoisting arms 11 and 12. The hoisting arms 11 and 12 are pivoted on a transverse shaft 13, carried by the side bars 3 and 4 of the frame 2 and the depending arms 14 and 15, constituting part of the elbow levers of which the arms 11 and 12 form part, are connected to a cross bar 16 by links 17 and 18. The cross bar 16 constitutes a connecting link between the power actuated piston rods 19 and 20 and the arms 14 and 15.

The piston rods 19 and 20 extend into the power cylinders 21 and 22 and they are provided on their ends with the usual pistons (not shown). The power cylinders are supported by the power mechanism supporting frame 23, which is shown as consisting of a rectangular frame smaller than and inside the confines of the frame 2. The power element supporting frame 23 is pivoted at its rear corners by the anchors 24 and 25, suspended from the shaft 13 and the forward transverse bar 26 is secured between its ends to a cross bar 27 fastened to the side rails 3 and 4 of the frame 2. The bar 26 is in pivotal engagement with the bar 27 by means of a pivot pin 28. Therefore, there is a three-point suspension provided for the frame 23; that is, by securing the two rear corners to the bar 13 and by supporting the front bar 26 from the bar 27 to the pivot 28. Therefore, it will be seen that the frames 1 and 2 may flex or distort without flexing or distorting the frame 23.

Any means may be provided for supplying power to the cylinders 21 and 22. The means shown consists of a pump 29, having an outlet 30 and an inlet 31. The pump is supported on the cross bar 32, carried by the side rails of the frame 23 and it may be driven by any suitable gearing from a suitable power source. The oil or hydraulic liquid will pass from 30, through pipe 33 to the U-shaped pipe 34, where it may discharge into the rear ends of the cylinders 21 and 22 and force the pistons forwardly, imparting a similar movement to the bar 16, pulling on the links 18 and 19 and swinging the bell crank lever consisting of the arms 11 and 12 and 14 and 15 into body raising position. When the car body has been raised into dumping position and it is desired to allow the body to drop back to its normal position, the valve 35, connecting pipe 33 to pipe 36, will be open, then oil can flow back from the rear end of the cylinders 21 and 22 through pipe 34, through the pipe 35 into pipe 36 and into the front ends of the cylinders through the branch pipes 37 and 38.

If the valve 35 is closed, the pump will operate to draw the oil out of the forward ends of the cylinders 21 and 22 and pump it into the rear ends of the cylinders 21 and 22 to actuate the hoist.

The bar 16 may be conveniently supported upon the top edges of the side bars of the frame 23 and it is so arranged that it will exert a substantially equal pull on both links 18 and 19 so as to maintain a uniform power to opposite sides of the dumping body 5.

It will be apparent that the entire operating mechanism, except the power shaft for driving the oil pump, may be supported by the three-point suspended frame 29 and that the operating mechanism can perform without liability of connections being broken on account of distortion since the frames 1 and 2 can distort irrespective of any movement of the power mechanism supporting frame, thereby eliminating the liability of connections becoming broken while the device is in use.

What I claim and desire to secure by Letters Patent is:

The combination with a body supporting frame, a transverse shaft carried by the frame near the rear end thereof, a bar carried by the frame near the front end thereof, a second frame hung from the shaft and pivotally connected to the bar, elbow levers journaled on the shaft and having arms adapted to swing upwardly, a body hinged to the frame and having guides on the bottom thereof in which the upper ends of the arms of the elbow levers ride, a power mechanism carried by the frame hung from the shaft and pivoted to the bar, and connections between the power mechanism and the elbow levers.

In testimony whereof I affix my signature.

JOHN R. JUNKIN.